Feb. 27, 1968

W. J. HUMPHREY 3,370,681

SPROCKET GEAR CLUTCH ASSEMBLY

Filed Dec. 16, 1965

INVENTOR.
WALTER J. HUMPHREY
BY
Elliott & Pastoriza
ATTORNEYS

United States Patent Office 3,370,681
Patented Feb. 27, 1968

3,370,681
SPROCKET GEAR CLUTCH ASSEMBLY
Walter J. Humphrey, Reseda, Calif., assignor to Kelly-Moore Paint Company, Inc., a corporation of California
Filed Dec. 16, 1965, Ser. No. 514,222
5 Claims. (Cl. 192—66)

ABSTRACT OF THE DISCLOSURE

This disclosure relates to a sprocket gear and clutch assembly therefor made up of a hub assembly, sleeve, and cam means. A clutch plate is removably attached to the sprocket gear and is arranged to be rotated by a friction disc under control of the sleeve and cam structure. The hub means rotates the sleeve and cam structure and the friction disc and when this friction disc is brought into engagement with the plate, the sprocket gear is rotated. Suitable ball-type locking means are employed when the disc and plate are in engagement with each other.

The plate may readily be replaced by simply removing the same from the sprocket gear and this advantage avoids the necessity of replacing the sprocket gear everytime the clutch plate becomes worn. In addition, there is provided a threaded adjusting means for positively positioning the plate relative to the driving disc when the same is in clutching engagement so that wear of the plate and disc can be compensated.

---

This invention relates generally to clutches and more particularly to a sprocket gear clutch assembly for direct chain drives.

Presently available sprocket gear clutch assemblies are often characterized by their large size and stress-producing manner of engaging the sprocket gear with the source of rotative power. These clutch assemblies do not include means for smoothly transmitting rotation to the sprocket gear; and, consequently, the parts of the clutch assembly must be built of relatively substantial dimensions to absorb the imposed stresses. Accordingly, the sprocket gear itself must necessarily be of substantial dimensions, thus often requiring the use of an external gear box to produce a high speed output drive. The overall flexibility of operation is accordingly limited.

Another disadvantage associated with many prior art clutch assemblies is that the sprocket gear is integrally mounted with a clutch element such that when the clutch element becomes worn and requires replacement, a new sprocket gear must also be installed even though the original sprocket gear is still capable of longer service.

Additionally, many prior art clutch assemblies include relatively rotatable elements made, for example, of steel, which are disposed in direct steel-to-steel contact, thus creating wear and heat build-up due to friction therebetween, thereby necessitating frequent replacement of these elements.

Moreover, these clutch assemblies do not include suitable means for adjusting the engageable clutch members to compensate for wear thereon with the result that the clutch assembly produces "slip" after extended use.

With the foregoing in mind, it is accordingly a primary object of this invention to provide a sprocket gear clutch assembly characterized by smooth, grab-free engagement resulting in a compact structural arrangement wherein a small sprocket gear may be used for direct drive, high-speed operation.

Another object is to provide a sprocket gear clutch assembly wherein the intermittently engaged clutch elements may be replaced without the necessity of replacing the sprocket gear.

Yet another object is to provide a sprocket gear clutch assembly wherein normal wear between the clutch elements may be easily compensated for through a simple adjustment means.

Briefly, these and many other objects and advantages of this invention are attained by providing a sprocket gear clutch assembly adapted to transmit rotation of a shaft to a sprocket gear or vice versa. The sprocket gear is adapted to receive a conventional drive chain coupled, in turn, to a driven or driving mechanism.

The clutch assembly preferably includes a clutch plate removably secured to the sprocket gear and a clutch disc adapted to be moved axially into and out of driving engagement with the clutch plate by a suitable actuating means so as to couple the shaft and sprocket gear for conjoint rotation when desired.

The actuating means includes a locking means for locking the clutch assembly in an engaged driving position.

The sprocket gear and clutch plate are preferably mounted on a bearing means for conjoint rotation as a unit, the unit being rotatable with respect to the shaft and clutch disc when the clutch assembly is unlocked and disengaged.

Adjustment means are included in the clutch assembly for adjusting the position of the clutch plate with respect to the clutch disc as wear occurs therebetween.

A better understanding of the invention will now be had by referring to a preferred embodiment thereof as illustrated in the accompanying drawings, in which.

Figure 1:
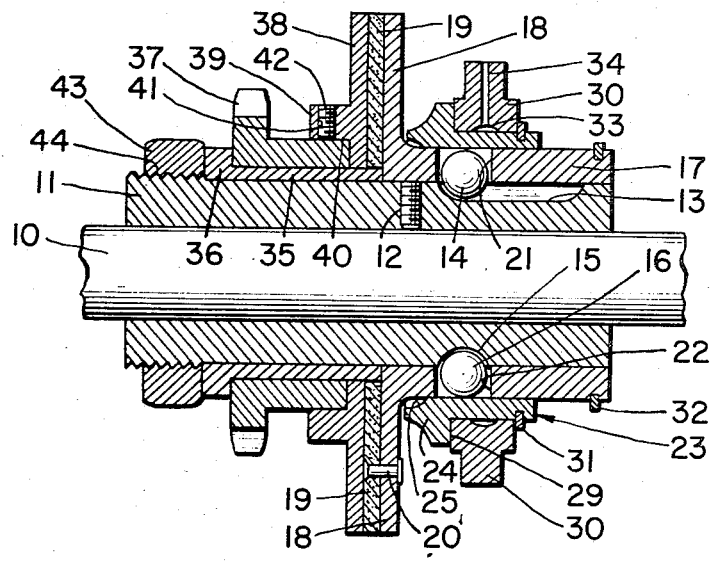
FIGURE 1 is a sectional view of the sprocket gear clutch assembly of this invention in an engaged position.
Figure 3:
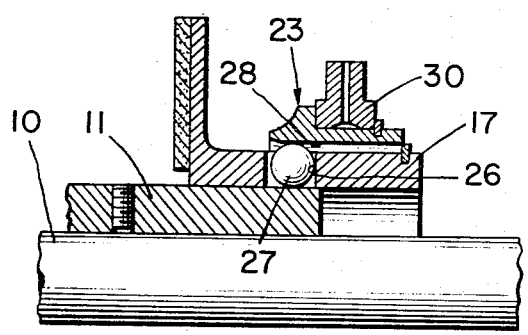

Referring first to FIGURES 1 and 3, there is shown a rotatable shaft 10 having a generally tubular hub member 11 secured thereto by means including a set screw 12. The outer periphery of the hub member 11 is preferably provided with two circumferentially spaced, longitudinal or axially extending grooves 13, one of which is shown in FIGURE 1 as receiving a torque transmitting ball 14. The other of the grooves 13 (not shown) also receives a ball 14 in a similar manner.

The outer periphery of the hub member 11 is also provided with a plurality of semi-spherical recesses 15 being circumferentially spaced from each other and from the longitudinal grooves 13. One such recess 15 is illustrated in FIGURE 1 as receiving a locking ball 16 therein as shown. It is to be understood that each of the recesses 15 is adapted to receive a locking ball 16 in the manner illustrated.

Mounted for axial sliding movement on the hub member 11 is a sleeve member 17 to which is integrally connected an annular clutch disc 18 as shown. The clutch disc 18 is preferably provided with a facing disc 19 secured thereto as by rivets 20.

The sleeve 17 is provided with two circular openings 21 communicating, respectively, with each of the longitudinal grooves 13, one such opening being shown in FIGURE 1 as receiving the ball 14. By means of this arrangement, rotation of the hub 11 is transmitted to the sleeve 17 while at the same time permitting the sleeve 17 to move axially or longitudinally with respect to the hub 11. It will be apparent that the extent of longitudinal movement of the sleeve 17 is limited by the length of the grooves 13 within which the balls 14 roll.

The sleeve 17 is further provided with a plurality of circumferentially spaced circular openings 22 communicating, respectively, with the recesses 15 in the hub 11. One such opening is shown as receiving the locking ball 16 seated in the recess 15. By means of this arrangement, the sleeve 17 is locked in the position shown against axial movement with respect to the hub 11 when the locking balls 16 are held within the recesses 15 by means to be hereinafter described.

Slidably positioned about the sleeve 17 is a cam sleeve 23 which includes an annular end flange 24 having an undercut annular groove 25 defined therein as shown. When positioned as shown in FIGURE 1, the cam sleeve 23 encloses the openings 22 within which the locking balls 16 are positioned to maintain the balls 16 in the recesses 15, thus locking the sleeve 17 in the position shown. The groove 25 is designed to co-function with the locking balls 16 in a manner and for purposes to become clearer in the subsequent description of the operation of the clutch assembly.

FIGURE 3 illustrates a means for coupling the cam sleeve 23 to the sleeve 17 for conjoint rotation while at the same time permitting the cam sleeve 23 to move axially with respect to the sleeve 17. Towards this end, the sleeve 17 is provided with an opening 26 receiving a torque transmitting ball 27 rollable on the hub 11. The cam sleeve 23 includes a longitudinal groove 28 defined in its inner periphery for receiving the top portion of the ball 27. The ball 27 thus serves to transmit rotation of the sleeve 17 to the cam sleeve 23 in much the same manner as the balls 14 transmit rotation of the hub 11 to the sleeve 17.

As best shown in FIGURE 1, the cam sleeve 23 includes an annular shoulder 29 against which is positioned a collar 30 held in position by means of a retaining ring 31 mounted on the cam sleeve 23. The collar 30 is designed for coupling to a conventional actuating mechanism of the type shown, for example, in U.S. Patent No. 2,508,558.

In order to move the sleeve 17 to the right, the actuating mechanism is operated to move the collar 30 and cam sleeve 23 to the right over the sleeve 17. An abutment ring 32 is positioned around the sleeve 17 near an end thereof opposite the clutch disc 18. It will be apparent that the cam sleeve 23 will abut against the abutment ring 32 such that continued axial movement of the collar and cam sleeve will cause the sleeve 17 to be moved therewith over the hub 11 to the disengaged position shown in FIGURE 2.

Since the collar 30 is adapted to be coupled to an actuating mechanism, the collar 30 will, of course, be held against rotation. Thus, the cam sleeve 23 is rotatable within the collar 30 and suitable lubrication means must be provided to reduce friction to an acceptable minimum. Towards this end, an annular groove 33 is defined in the inner periphery of the collar 30 in communication with the outer periphery of the cam sleeve 23. The collar 30 further includes a radial passage 34 extending therethrough in communication with the annular groove 33. A suitable lubricant may be forced through the passage 34 into the annular groove 33 to thus lubricate the relatively rotatable engaged surfaces of the collar 30 and cam sleeve 23.

Rotatably mounted upon the hub 11 is a bearing sleeve 35 which may, for example, be made of an oil-impregnated, bronze material. The bearing sleeve 35 includes an increased diameter, annular flange 36 on an end thereof as shown.

A sprocket gear 37 is press-fitted on the outer periphery of the bearing sleeve 35 with an end of the sprocket gear 37 abutting against the annular flange 36. Mounted on the bearing sleeve 35 is an annular pressure plate 38 which includes an annular flange 39 having its inner periphery 40 extending over an end of the sprocket gear 37 as shown. The flange 39 is preferably provided with a threaded, radially extending opening 41 for receiving a set screw 42 for removably securing the pressure plate 38 to the sprocket gear 37.

The clutch assembly includes an adjustment means for compensating for wear occurring between the pressure plate 38 and the facing disc 19 secured to the clutch disc 18. This adjustment means includes an adjustment nut 43 threadedly secured at 44 to an end of the hub 11. Thus, rotation of the adjustment nut 43 will move the bearing sleeve 35, sprocket gear 37, and pressure plate 38 to the right into engagement with the facing disc 19. It is apparent that removal of the adjustment nut 43 allows the bearing sleeve 35, sprocket gear 37, and pressure plate 38 to be removed from the clutch assembly when necessary.

Figure 2:
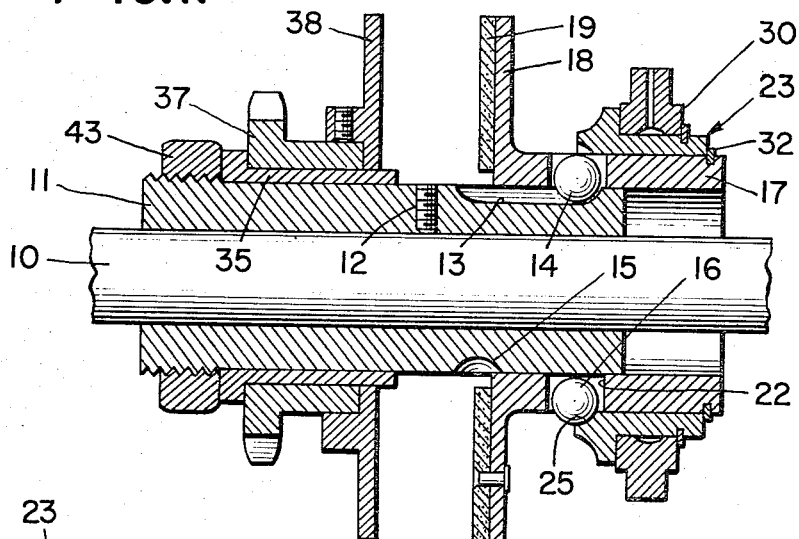
FIGURE 2 is a sectional view of the clutch assembly of FIGURE 1 in a disengaged position; and, FIGURE 3 is a fragmentary sectional view of the torque transmitting means in the clutch assembly of FIGURE 1.

FIGURE 2 illustrates the unlocked and disengaged position of the clutch assembly wherein the structure shown is rotatable with respect to the collar 30, bearing sleeve 35, sprocket gear 37, and pressure plate 38 with the result that rotation of the input shaft 10 is not imparted to the sprocket gear 37.

In operation, a drive chain (not shown) will be positioned on the sprocket gear 37 to be driven by the rotatable shaft 10. It will be apparent that the sprocket gear 37 may be driven by the chain to drive the shaft 10, if desired.

Assuming that the shaft 10 is the input drive member, and with reference to FIGURE 2, it will be apparent that when the clutch assembly is in the disengaged position shown, rotation of the various elements of the clutch assembly is accomplished in the following manner: Rotation of the shaft 10 imparts conjoint rotation to the hub 11 through the engagement of the set screw 12, in addition to which a standard key (not shown) may be used. Rotation of the hub 11 is transmitted to the sleeve 17 and disc 18 through the torque transmitting balls 14 and as shown in FIGURE 3, rotation of the sleeve 17 is transmitted to the cam sleeve 23 through the cam torque ball 27.

To engage the clutch assembly to rotate the sprocket gear 37 and the attached drive chain, the non-rotatable collar 30 is moved towards the left by a suitable actuating mechanism such as shown in the abovementioned U.S. patent. This movement causes the cam sleeve 23 to engage the locking balls 16 which, in turn, move the sleeve 17 and clutch disc 18 towards the pressure plate 38. This axial movement is continued until the balls 16 are positioned over the recesses 15, at which point the facing disc 19 of the clutch disc 18 engages the pressure plate 38 to cause rotation of the pressure plate 38, sprocket gear 37, and bearing sleeve 35.

The clutch assembly is locked in the above-described engaged position by continuing the leftward movement of the cam sleeve 23 over the sleeve 17. The engagement of the groove 25 with the locking balls 16 allows the cam sleeve 23 to roll over the balls to cause them to be seated in the respective recesses 15, thereby locking the assembly in the engaged position as best shown in FIGURE 1 wherein all of the structure shown will rotate together with the exception of the non-rotatable collar 30.

To unlock and disengage the clutch assembly, the cam sleeve 23 is moved to the right over the sleeve 17. During this movement, the balls 16 will be freed from their locked positions in the recesses 15 when the groove 25 in the cam sleeve 23 is positioned over the openings 22. At this point, the end of the cam sleeve 23 engages the abutment ring 32 to cause the sleeve 17 and clutch disc 18 to move to the right to the disengaged position shown in FIGURE 2.

The above-described structural arrangement and mode of operation enables the clutch assembly to be engaged and disengaged in a smooth, grab-free manner, thereby reducing the shock loads and high stresses imposed in the operation of prior art clutch assemblies.

During prolonged operation of the clutch assembly, wear will, of course, occur on the pressure plate 38 and the facing disc 19. To compensate for such wear, the adjustment nut 43 is simply turned on the hub 11 to thus move the bearing sleeve, sprocket gear, and pressure plate to the right so that the pressure plate is in firm engagement with the facing disc 19.

Should the pressure plate 38 become worn requiring its replacement, it is a simple matter to replace the same by removing the nut 43 and then removing the bearing sleeve, sprocket gear, and pressure plate from the hub. The worn pressure plate 38 may then be removed from the bearing sleeve and sprocket gear after loosening the set screw 42. A new pressure plate may then be installed and the entire unit replaced on the hub. It is thus apparent that the pressure plate may be replaced without the necessity of replacing the bearing sleeve and sprocket gear, or vice versa.

The provision of the annular flange 36 on the bearing sleeve 35 prevents direct steel-to-steel contact between the nut 43 and the sprocket gear 37 to thereby reduce friction and increase operational life of the assembly.

From the foregoing, it will be apparent that this invention provides a smooth-acting, compact clutch assembly capable of prolonged, trouble-free operation. Various changes falling within the scope and spirit of this invention will occur to those skilled in the art. The sprocket gear clutch assembly is, therefore, not to be thought of as limited to the specific embodiment set forth.

What is claimed is:

1. A sprocket gear clutch assembly, comprising: hub means adapted to be mounted for rotation, said hub means including a longitudinal groove and a spherical recess on its periphery, said groove and said recess being circumferentially spaced from each other; sleeve means slidably positioned on said hub means, said sleeve means including spaced openings communicating with said groove and said recess, respectively; torque transmitting means positioned in said groove and in one of said openings for transmitting rotation of said hub means to said sleeve means; cam means slidably positioned on said sleeve means; locking means positioned in the other of said openings and adapted to be held in said recess by said cam means when said cam means is in a first position thereby locking said sleeve means to said hub means; disc means secured to said sleeve means; bearing means mounted for rotation on said hub means; sprocket gear means secured to said bearing means for conjoint rotation; plate means removably secured to said sprocket gear means and adapted to be engaged by said disc means for conjoint rotation when said cam means is in said first position, whereby movement of said cam means to a second position frees said locking means from engagement with said recess thereby moving said disc means out of engagement with said plate means for permitting said hub means to rotate with respect to said sprocket gear means; and adjustment means on said hub means for changing the physical position of said plate means relative to said hub means to thereby maintain the plate means in a desired engagement with said disc means when said cam means is in said first position.

2. The subject matter of claim 1, including means for coupling said cam means to said sleeve means for conjoint rotation while permitting relative longitudinal sliding movement therebetween.

3. The subject matter of claim 1, in which said bearing means includes an annular flange positioned between said adjustment means and an end of said sprocket gear means for preventing frictional engagement between said adjustment means and said sprocket gear means.

4. The subject matter of claim 1, including collar means coupled to said cam means for moving said cam means between said first and second positions.

5. A sprocket gear clutch assembly, comprising: hub means adapted to be mounted for rotation, said hub means including a longitudinal groove and a spherical recess on its periphery, said groove and said recess being circumferentially spaced from each other; sleeve means slidably positioned on said hub means, said sleeve means including spaced openings communicating with said groove and said recess, respectively; torque transmitting means positioned in said groove and in one of said openings for transmitting rotation of said hub means to said sleeve means; cam means slidably positioned on said sleeve means; locking means positioned in the other of said openings and adapted to be held in said recess by said cam means when said cam means is in a first position thereby locking said sleeve means to said hub means; disc means secured to said sleeve means; bearing means mounted for rotation on said hub means; sprocket gear means secured to said bearing means for conjoint rotation; and plate means removably secured to said sprocket gear means and adapted to be engaged by said disc means for conjoint rotation when said cam means is in said first position, whereby movement of said cam means to a second position frees said locking means from engagement with said recess thereby moving said disc means out of engagement with said plate means for permitting said hub means to rotate with respect to said sprocket gear means, said plate means including an annular flange surrounding a portion of said sprocket gear means, said flange including at least one radially extending opening for receiving a set screw for engaging said sprocket gear means, whereby said plate means may be disengaged from said sprocket gear means by loosening the engagement of said set screw.

References Cited

UNITED STATES PATENTS

| | | | |
|---|---|---|---|
| 2,751,055 | 6/1956 | Dodge et al. | 192—114 |
| 2,887,201 | 5/1959 | Willis | 192—114 |

FOREIGN PATENTS

| | | |
|---|---|---|
| 46,486 | 5/1918 | Sweden. |

ROBERT, M. WALKER, *Primary Examiner.*

ARTHUR T. McKEON, *Examiner.*